United States Patent

[11] 3,595,525

| [72] | Inventor | Edward E. Yaste<br>Burlingame, Calif. |
|---|---|---|
| [21] | Appl. No. | 744,994 |
| [22] | Filed | July 15, 1968 |
| [45] | Patented | July 27, 1971 |
| [73] | Assignee | Powerflow Engineering and Equipment Company, Inc.<br>Palo Alto, Calif. |

[54] PORTABLE AIRCRAFT JACK
6 Claims, 7 Drawing Figs.

[52] U.S. Cl. .................................................. 254/2, 254/93, 92/53
[51] Int. Cl. ...................................................... B60p 1/00, B66f 3/24
[50] Field of Search ........................................... 254/1, 2, 93, DIG. 1; 92/51, 52, 53, 118, 119, 161

[56] References Cited
UNITED STATES PATENTS

| 2,594,270 | 4/1952 | Niederhouser | 254/1 |
| 2,734,716 | 10/1956 | Pearne | 254/93 X |
| 3,106,825 | 10/1963 | Bardall | 92/161 UX |

Primary Examiner—Andrew R. Juhasz
Assistant Examiner—David R. Melton
Attorney—Townsend and Townsend ABSTRACT: A portable aircraft jack in which a double cylinder hydraulic jack is rigidly mounted at one end of a wheeled trailer which has a towing handle at the opposite end. The rear trailer wheels are mounted on pivot arms connected to the handle by a linkage so that raising the handle will pivot the wheel arms and cause the rear of the trailer to be lowered thus lowering the jack for placement under a vehicle to be lifted. The jack has inner and outer cylinders, each separately supplied with hydraulic fluid, thus leaving one fully operative should the other cylinder fail.

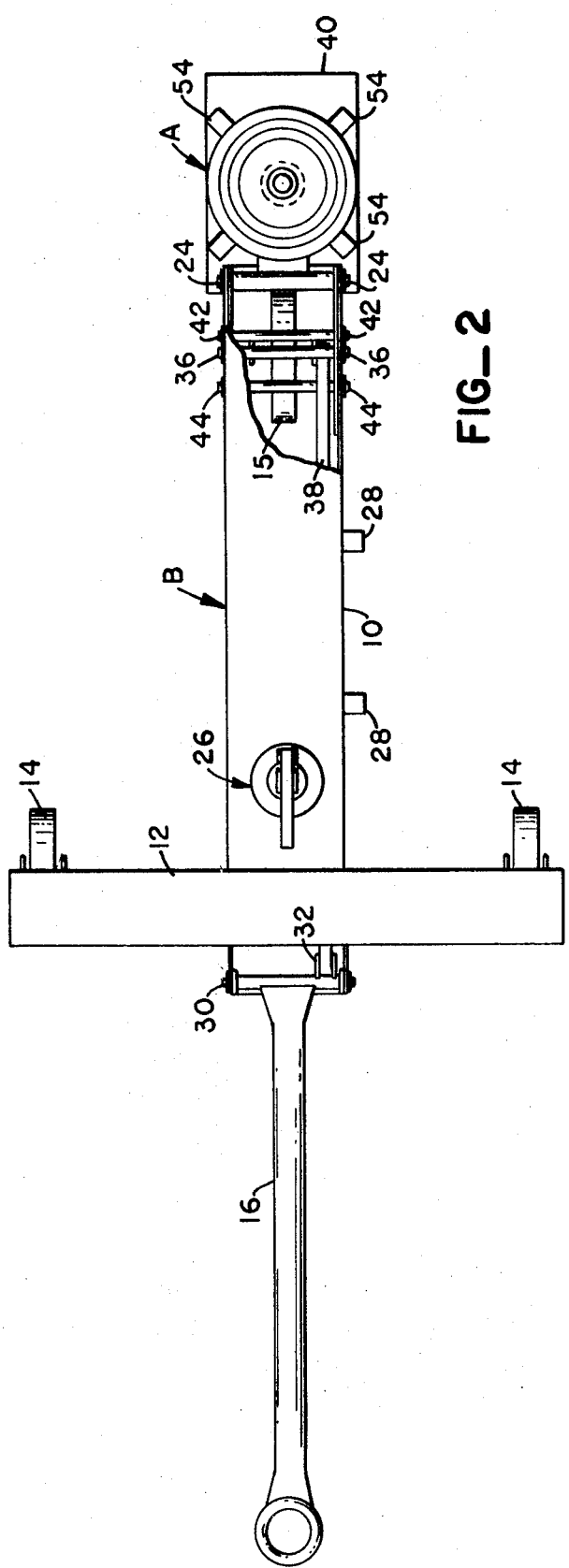
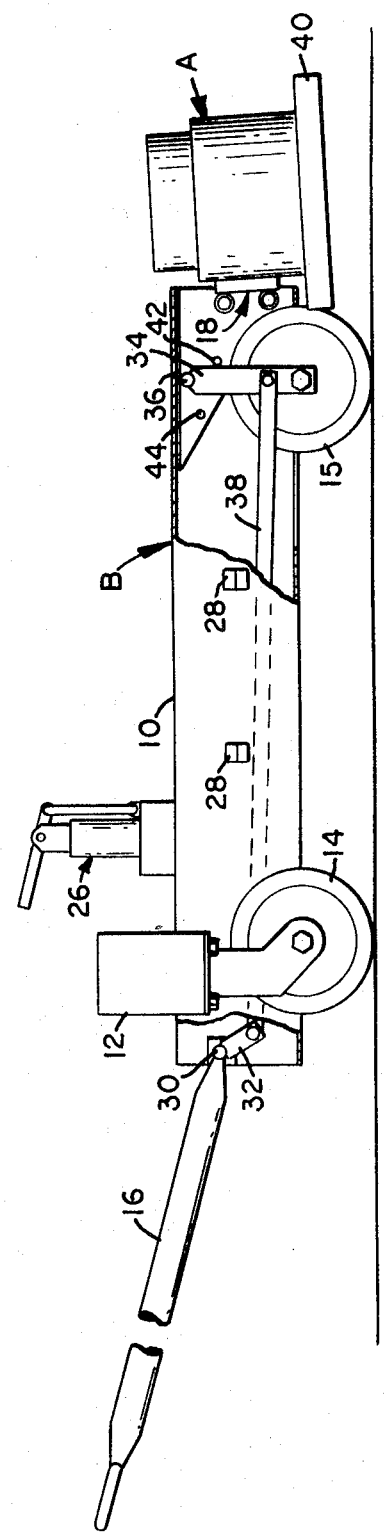
INVENTOR.
EDWARD E. YASTE
BY
*Townsend and Townsend*
ATTORNEYS

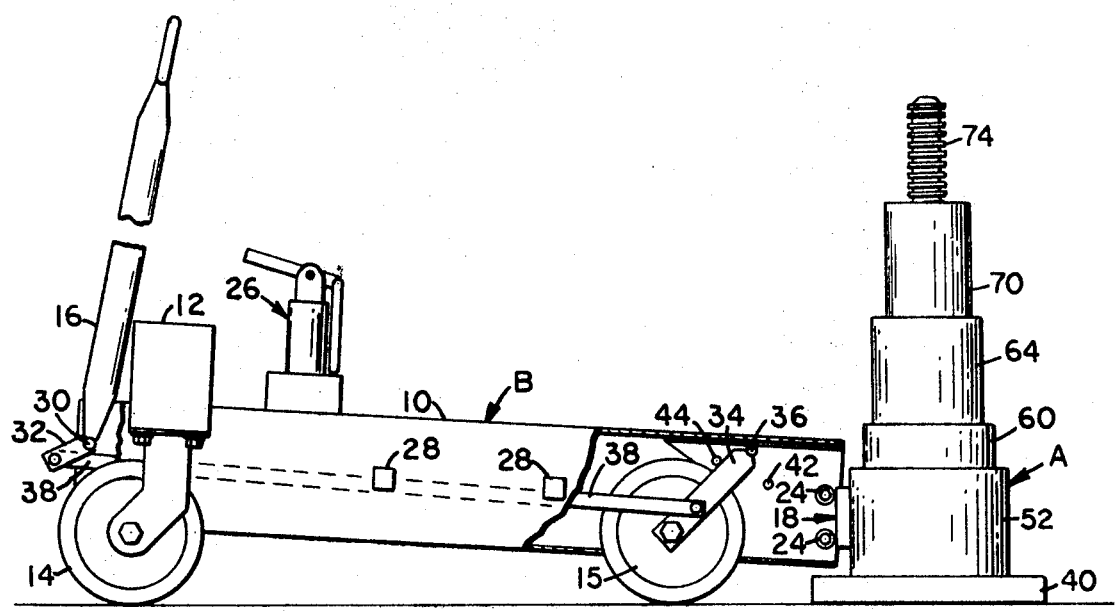
FIG_3
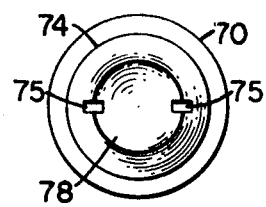
FIG_7
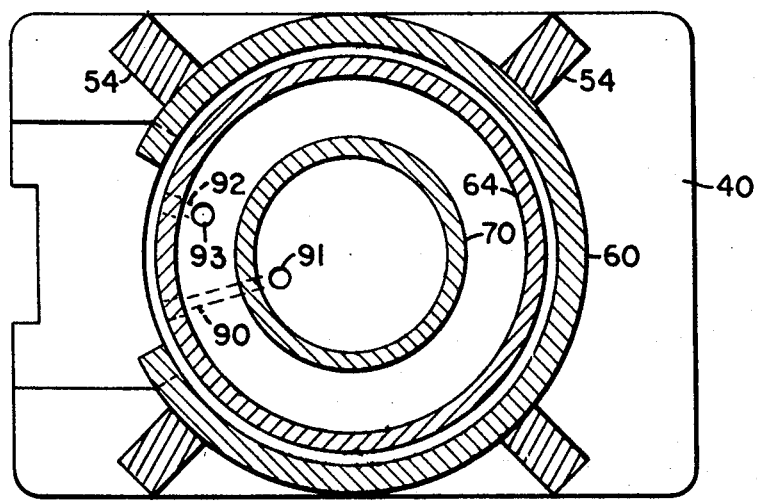
FIG_6
INVENTOR.
EDWARD E. YASTE
BY
Townsend and Townsend
ATTORNEYS

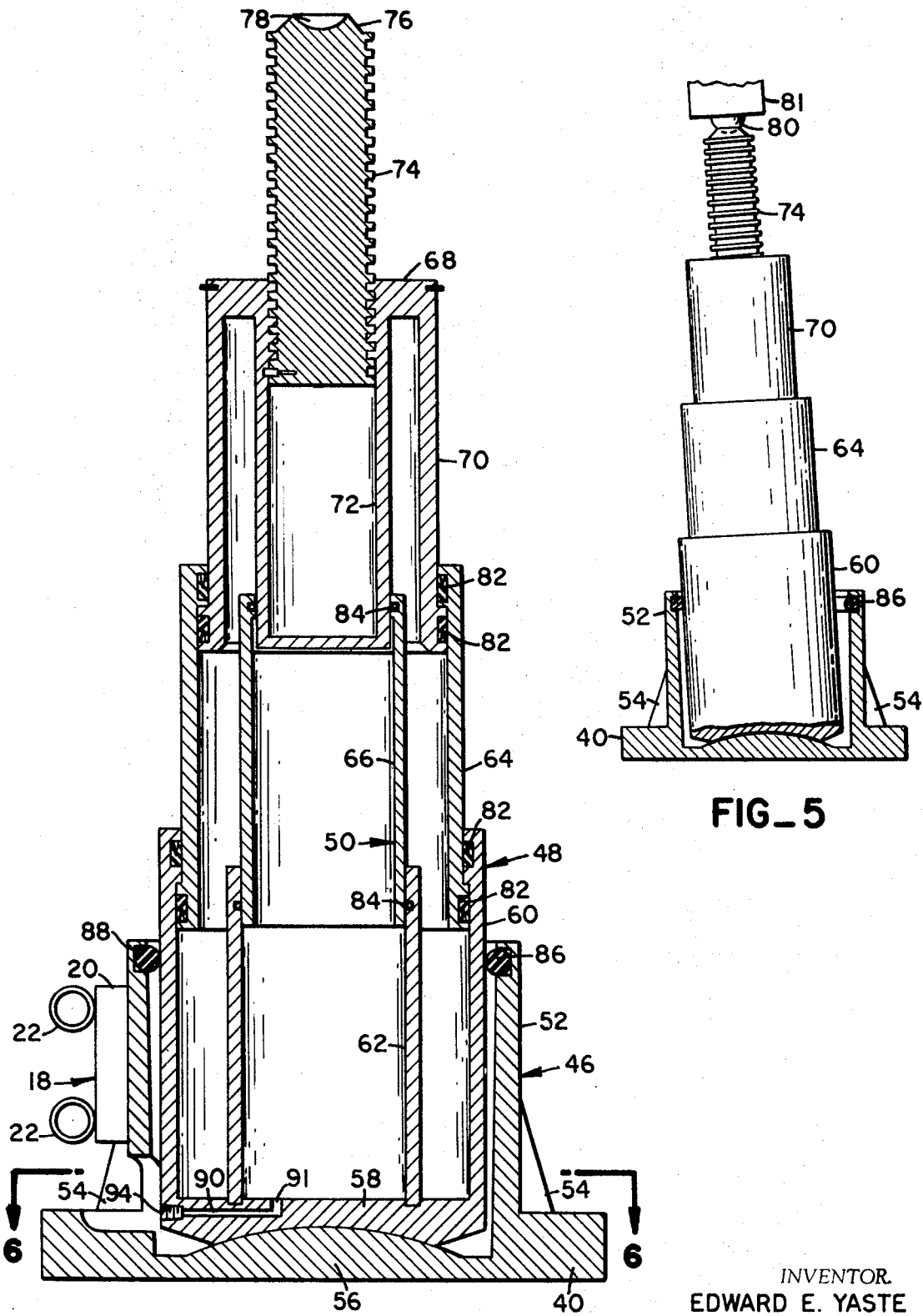

PORTABLE AIRCRAFT JACK

This invention relates to portable aircraft jacks and, in particular, to a wheel-mounted twin-cylinder hydraulic jack.

Wheel-mounted hydraulic jacks are well known, having been utilized in the automotive industry for many years. Hydraulic jacks for lifting aircraft for servicing are also well known. Conventional aircraft hydraulic jacks mounted on wheeled platforms have been used for easy access to aircraft for lifting the wheels for servicing of the tires, brakes and other wheel mechanisms.

One of the primary drawbacks of conventional mobile aircraft jacks is the consideration of safety of the aircraft-servicing personnel. All the aircraft jacks of which I have knowledge comprise conventional hydraulic cylinders telescoping together, the entire jack being supplied from a single source of hydraulic fluid. In the event there is a failure of the hydraulic system either through the failure of the fluid supply hoses or the cylinder seals, the raised aircraft may be suddenly lowered with disastrous consequences. As a result of the safety problem, the standard procedures for servicing aircraft require that only one wheel assembly at a time may be lifted from the ground to preclude dropping the entire aircraft with consequent injury to personnel and damage to the aircraft.

A further problem arising from the use of conventional hydraulic jacks in the raising of aircraft arises from the inherent characteristics of the telescoping cylinders of such a jack. After the jack is wheeled into place and the assembly lowered so that the jack's base is resting on or near the ground, the hydraulic cylinders are raised until the head of the jack engages the lifting ball on the wheel assembly. As the jack continues to be raised and the aircraft is lifted, there is a tendency for the jack cylinders to be pushed askew through the effect of the changed angle of the aircraft as the vehicle is lifted. The extensive side loads on the jack result in substantial wear on the cylinder walls leading to early failure of the seals and, in some cases, of the cylinder walls themselves.

The present invention is designed to overcome the two major problems associated with aircraft jacks in present use. This is accomplished in the present invention, first, by the use of a twin cylinder hydraulic jack of novel construction and, second, by designing the jack so that the telescoping cylinders rest upon an internal ball socket base which automatically compensates for the shifting position of the mounting ball on the aircraft as the aircraft is lifted.

The hydraulic jack is provided with separate sets of telescoping cylinders. The inner cylinder set is completely separate from the outer cylinder set, including separate hydraulic fluid feed. The effect of the use of the separate cylinders in a single unit is that there are two jacks supporting the load rather than one. Thus, even if there were failure of the hydraulic system of one of the cylinders when the jack was loaded, the other would have sufficient capacity to support the entire load.

The self-aligning feature of the jack comprises an internal semispherical ball in a complementary socket. The base portion of the jack, upon which the double cylinders are mounted, has a semispherical projection onto which is fitted the lower portion of the double cylinder structure. This lower portion of the double cylinder structure includes a complementary socket which rides on the spherical projection. The cylinders thus do not rest on a flat base but on a spherical surface and are thus able to move within several degrees from the vertical in any direction. The socket and projection are sealed within the base structure so that there is little likelihood that dirt or other foreign matter can enter between the mating surfaces. In the drawings:

FIG. 1 is a side elevation, partially cut away of the jack mounted on the wheeled trailer;

FIG. 2 is a plan view of the mounted jack;

FIG. 3 is a side elevation similar to FIG. 1, but showing the trailer wheel pivoted so that the jack base has been lowered to the ground;

FIG. 4 is a section view of the jack showing the double cylinders and the spherical base;

FIG. 5 is a partial section of the jack showing movement of the cylinders while the base remains stationary;

FIG. 6 is a cross section of the jack taken along lines 6–6 in FIG. 4; and

FIG. 7 is a top view detail of the screw portion of the jack.

Referring now more particularly to the drawings in which the same reference numerals refer to identical parts in each of the several views, the portable jack assembly is shown generally in FIGS. 1 and 2. In FIG. 1 the hydraulic jack itself is shown generally at A, the wheeled platform designated generally as B. The platform B comprises an elongate main frame 10 having a cross frame 12 affixed at its forward end so that the entire structure is in the shape of a T. Pneumatic casters are mounted on the underside of the frames, two casters 14 being pivotally mounted outboard of the cross frame 12 and a single caster 15 mounted at the rear of the main frame 10. A towbar 16 is connected to the forward end of the main frame to permit the jack to be towed into position and to be maneuvered close to the aircraft to be serviced. The towbar 16 is also used to raise and lower the jack mounted at the rear end of the frame in an operation which will be described below.

The hydraulic jack assembly A which is shown in its fully retracted position in FIG. 1 is provided with a mounting bracket 18 comprising a filler block 20 to which is welded a pair of elongate mounting tubes 22 inside of which the jack-mounting pins 24 pass to rigidly mount the jack assembly A on the trailer B.

Conveniently located on the upper surface of the frame 10 is the hydraulic pump 26 which is connected by the usual tubing (not separately shown) to the hydraulic jack A. The pump 26 is supplied with the necessary hydraulic fluid from a reservoir carried on the trailer B. Mounted on one side of the frame 10 is a pair of clips 28 designed to permit tools and other items to be conveniently carried along with the trailer.

The towbar 16 at the forward end of the unit is rigidly mounted, as by welding, to a pivot bar 30 rotatably mounted at the forward end of the frame 10. Crank arm 32 is welded to the bar 30 at right angles to the longitudinal axis of the pivot bar. The rear caster 15 is rotatably mounted on pivot arm 34. Arm 34 is pivotally mounted at its upper end on pivot pin 36 which passes through the sidewalls of the frame 10. Link 38 connects pivot arm 34 with crank arm 32 so that when the towbar 16 is moved from a generally horizontal position as shown in FIG. 1 to a generally vertical position as shown in FIG. 3, pivot arm 34 is pulled forward through action of the crank arm 32, thus lowering the rear of the frame 10 and causing the base plate 40 of the hydraulic jack to be lowered to the ground. The pivot arm 34 holds its position when the trailer is either raised or lowered by means of stop pins 42 and 44. When the trailer is in the raised position, the pivot arm 34 is in an over center position past vertical resting against pin 42. The pivot arm therefore tends to remain in a position against pin 42 with the end of the trailer raised until the pivot arm is moved through the raising of the towbar 16. When the towbar 16 is raised, the pivot arm 34 rotates forward until it is resting against pin 44. At this point the end of the trailer has been lowered until the base 40 of the hydraulic jack is resting on the ground.

The hydraulic jack itself comprises inner and outer sets of cylinders, the inner set concentric to the outer set, and both sets joined together so that when a load is supported on the jack, failure of either the inner or outer set of cylinders or of their hydraulic fluid supply will not cause the jack to be lowered.

The hydraulic jack comprises a base assembly 46, a set of outer cylinders 48 and a set of inner cylinders 50. The base assembly 46 comprises a flat base portion 40 having an upright cylindrical shell 52 mounted thereon for receiving the telescoping inner and outer sets of cylinders 48 and 50. In order to increase the side load capacity of the cylindrical shell 52, triangular braces 54 are welded around the outer circumference of the shell 52.

Inside the cylindrical shell and formed in the base is a hemispheric projection 56 which is concentric with the inside diameter of the cylindrical shell. The radius of the hemisphere in this embodiment is substantial being approximately equal to the inside diameter of the cylindrical shell. This large diameter results in maximum surface area for the cooperating socket 58 to ride upon. The socket 58 is formed in the base portion of the first stage cylinder 60. Mounted inside the first stage cylinder and concentric therewith is the inner first stage cylinder 62. The second stage outer cylinder 64 fits snugly within the inside diameter of the outer first stage cylinder 60. Inside second stage outer cylinder 64 and concentric therewith is the second stage inner cylinder 66. This cylinder rides within the inside diameter of the first stage inner cylinder 62. The third or upper stage of the jack comprises inner and outer cylinders formed together with a head portion 68. The outer cylindrical portion 70 of the third or upper stage is slidingly received within the inside diameter of second stage outer cylinder 64. In like manner the inner third stage cylinder 72 which is concentric with the outer cylinder 70 is slidingly received within the inside diameter of the second stage inner cylinder 66. The head portion 68 of the upper stage has a bore through the center provided with screw threads for the extension screw 74. The extension screw may be manually raised or lowered by utilizing cross slots 75 in the end of the screw in order to bring the jack as close as possible to the aircraft when the jack is placed in position. The upper end 76 of the extension screw is formed with a spherical recess 78 to engage the spherical lift pad 80 with which the aircraft wheel assembly 81 is normally provided.

The outer cylinders are sealed by means of U-cups 82 with diameters appropriate for the cylinders for which they are used to seal the hydraulic fluid inside the cylinders. The inner cylinders are sealed by means of appropriate O-rings 84. In order to keep dirt and grit out of the inside of the cylindrical shell 52 and in order to maintain the cylinders in substantially vertical position, a rubber bumper 86 is fitted into an appropriate groove 88 a the upper portion of the inside diameter of the shell 52. The bumper maintains a grip on the outer surface of first stage cylinder 60 to seal the inner portion from dirt although there is sufficient yield in the bumper to permit the cylinder 60 to move on the cylindrical surface 56 in order to accommodate misalignment of the jack.

The accommodation of misalignment by the jack even though the base of the jack is squarely on the ground is a prime feature of the invention. The inner and outer cylinders are mounted together rigidly on the base portion 60 of the outer cylinder. If the spherical lift pad 80 is not directly lined up with the center of the jack, there will be a tendency for the jack to tip in order to accommodate the misalignment. In conventional jacks the cylinders flex and bend, quickly wearing out the walls by scoring as one surface rubs on another surface.

The twin cylinders of the jack are, as has been explained, entirely separate from one another. Each cylinder is supplied with hydraulic fluid under pressure from the pump 26. The fluid is fed from the pump and through a novel valve assembly (not separately shown) which separates the fluid into two separate branches having the same pressure in each. Each branch then is led through hydraulic lines to the jack base. The inner cylinder is fed through bore 90 and outlet hole 91 drilled into the base 40. The outer cylinder is fed through bore 92 and outlet hole 93 in the base. A conventional inlet hole 94, having internal pipe threads, permits the hydraulic line to be connected to bore 90.

The jack is rolled into general position adjacent the wheel structure to be elevated and aligned with the spherical lift pad 80. Lifting tow bar 16 will cause the rear end of the frame 10 to be lowered, placing base plate 40 on the ground. Applying hydraulic pressure to the jack by means of the pump 26 will cause both the inner and outer cylinders to be lifted in unison until the spherical recess 78 engages the lift pad 80. Because of the size of the jack it is difficult to align the jack perfectly with the lift pad 80. Therefore, as the jack cylinders are lifted, the recess 78 will engage the pad 80 and then cause the jack cylinders to shift to be on a direct axis below the pad. The jack cylinders will shift or pivot in order to be aligned along the vertical axis below the spherical pad. The hemisphere projection 56 inside base 60 permits the cylinders to pivot along the cooperating socket 58. Since the projection and socket are spherical the cylinders may shift angularly within a conical projection whose apex is located below the jack base. In the present embodiment the included angle of the cone is approximately 6°, thus movement of the cylinders is approximately 3° from vertical in any direction.

Since the inner and outer sets of cylinders of the jack are entirely separate from each other, sudden failure of the seals of one hydraulic cylinder system will not affect the functioning of the remaining system so that the load sustained by the jack will remain elevated. Thus the jack, the cylinders of which have shifted to accommodate the misalignment of the jack and the aircraft lifting pad, may be used to lift an aircraft completely off the ground with complete safety.

While several embodiments of this invention have been shown and described, it will be apparent that other adaptations and modifications of this aircraft jack can be made without departing from the true scope and spirit of the invention.

I claim:

1. A hydraulic aircraft jack for mounting on a movable platform comprising: a base having upstanding walls forming a cylinder thereon for receiving a hydraulic piston assembly; a spherical mounting pad inside the base cylinder for supporting a complementary socket; a hydraulic piston assembly comprising an upper piston having first inner cylinder inside of and concentric with a first outer cylinder, a middle piston having a second outer cylinder adapted to engage the outer wall of the first outer cylinder and a second inner cylinder adapted to engage the outer wall of the first inner cylinder, and a lower piston having a third outer cylinder adapted to engage the outer wall of the second outer cylinder and a third inner cylinder adapted to engage the outer wall of the second inner cylinder, the third inner an outer cylinders mounted concentrically on a head member, the head member having a spherical socket complementary to the spherical mounting pad so that the piston assembly may pivot about a vertical axis through the spherical pad and within the cylindrical walls of the jack base; and means for supplying hydraulic fluid under pressure to the hydraulic piston assembly.

2. The hydraulic jack of claim 1 and wherein the means for supplying hydraulic fluid includes
   a first fluid passage through the head member for supplying hydraulic fluid to the inner cylinder,
   a second fluid passage through the head member for supplying hydraulic fluid to the outer cylinder, and
   means interconnecting the fluid passages for equalizing the pressure in the inner and the outer cylinders.

3. A portable aircraft jack comprising:
   a wheeled platform for supporting a hydraulic jack at one end thereof, the supporting end of the platform movable between a normal position and a lowered position;
   a hydraulic jack rigidly mounted at the movable end of the platform, said jack having a base portion which is lowered close to the ground when the platform is lowered, said jack comprising concentric inner and outer telescoping hydraulic cylinders, said cylinders separately supplied with hydraulic fluid under pressure for raising said cylinders, said cylinders provided with means for permitting relative movement of the cylinders with respect to the jack base; and
   means for supplying hydraulic fluid under pressure to the jack cylinders.

4. The portable aircraft jack of claim 3 and wherein the hydraulic jack comprises:
   a base, a first vertical cylinder mounted on the base and adapted for movement about a vertical axis, a second vertical cylinder concentrically affixed inside the first cylinder, a plurality of additional pairs of cylinders concentrically aligned and inserted within said first and second cylinders, so that inner and outer separate hydraulic cylinders are formed thereby, and means for supplying hydraulic fluid to said inner and outer cylinders so that there is equal pressure within the inner and outer cylinders, said means including valve means which will prevent loss of fluid from one of the cylinders if the other cylinder suddenly loses fluid.

5. The portable aircraft jack of claim 4 and wherein the first vertical cylinder is provided with a spherical socket at one end thereof, and wherein the base has a spherical projection thereon for receiving the spherical socket of the first cylinder.

6. The portable aircraft jack of claim 4 and wherein the innermost cylinder has a threaded bore therein for receiving a lifting member, and a threaded lifting member received in the threaded bore, said member having a socket at the upper end thereof for engaging a spherical lift pad on an aircraft.